H. A. LONG.
GEAR.
APPLICATION FILED APR. 29, 1916.
1,223,058.
Patented Apr. 17, 1917.
2 SHEETS—SHEET 1.
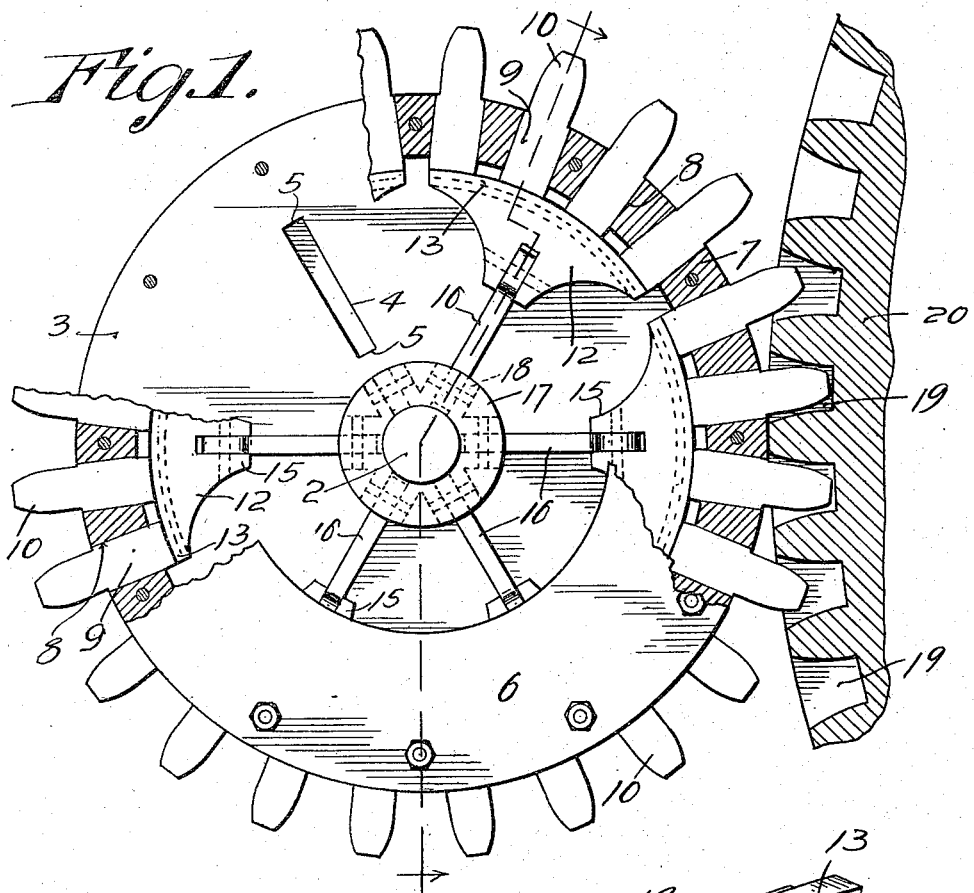
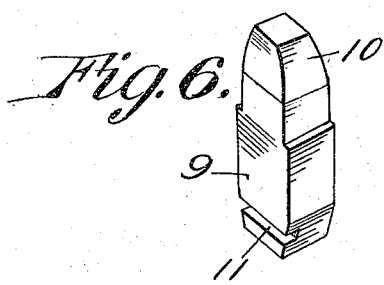
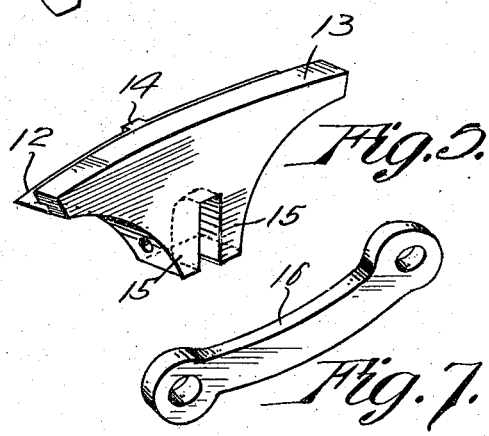
H. A. Long, Inventor
by C. A. Snow & Co., Attorneys
Witnesses

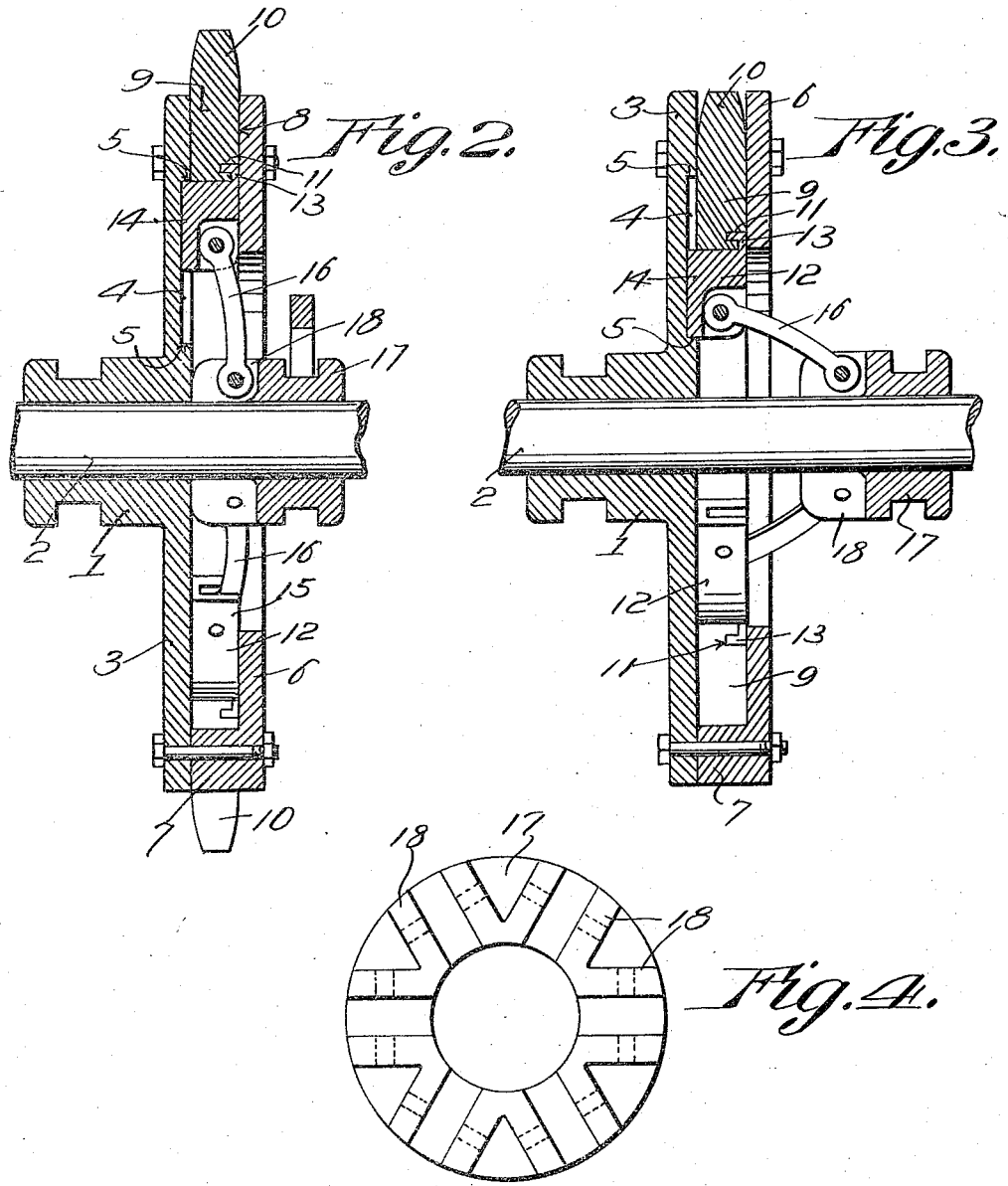

UNITED STATES PATENT OFFICE.

HUBERT A. LONG, OF BERKELEY, CALIFORNIA.

GEAR.

1,223,058.  Specification of Letters Patent.  Patented Apr. 17, 1917.

Application filed April 29, 1916. Serial No. 94,423.

*To all whom it may concern:*

Be it known that I, HUBERT A. LONG, a citizen of the United States, residing at Berkeley, in the county of Alameda and State of California, have invented a new and useful Gear, of which the following is a specification.

This invention relates to gears particularly designed for use in the transmission mechanism of automobiles although, obviously, it can be employed wherever gears are to be used.

One of the objects of the invention is to provide a combined friction and toothed gear, means being employed whereby all of the teeth of the gear can be simultaneously retracted back of the active face of the gear so as not to interfere with the shifting of the gears of the transmission mechanism.

A further object is to provide a gear of this character which is simple in construction, will not readily get out of order and which can be operated easily.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in side elevation and partly in section of a gear embodying the present improvements, the same being shown in engagement with another gear a portion of which is shown.

Fig. 2 is a section on line A—B Fig. 1.

Fig. 3 is a view similar to Fig. 2 and showing the teeth of the gear retracted.

Fig. 4 is an inner elevation of the shifting sleeve, the same being enlarged.

Fig. 5 is a perspective view of one of the tooth actuating segments.

Fig. 6 is a perspective view of one of the teeth.

Fig. 7 is a perspective view of one of the connecting links.

Referring to the figures by characters of reference 1 designates a hub mounted on a shaft 2 and formed integral with or secured to a disk 3. This disk has radial grooves 4 in one face provided with stop shoulders 5. Bolted to the disk 3 is a retaining ring 6 having a marginal flange 7 which constitutes means for holding the ring spaced from the disk 3, this flange being provided at regular intervals with openings or recesses 8 having parallel side walls. Slidably mounted within each of the openings 8 is a block 9 having a tooth 10 at the outer end thereof. A transverse groove 11 is formed in one face of the block 9 close to the inner end thereof.

The blocks 9 are arranged in groups and the blocks of each group bear against a segment 12 provided with a flange 13 with which the slotted end portions of the blocks interengage, as shown in Figs. 2 and 3. As flange 13 is undercut longitudinally it is designed to fit within the groove 11 and as the lower portions of the blocks project into the undercut portion of the flange 13, it will be obvious that the blocks and segment are thus held securely against radial displacement although the blocks are free to shift toward or away from each other along the segment. A guide rib 14 is provided upon one face of the segment and is designed to slide within one of the grooves 4. The inner end portion of the segment is provided with spaced ears 15 designed to receive between them one end of a link 16 which is pivotally connected to the segment. The links of the several segments are pivotally connected at their inner ends to a sleeve 17 slidably mounted on the shaft, this sleeve having ears 18 arranged in pairs and the links being extended between the ears of the respective pairs. Sleeve 17 can be shifted along shaft 2 in any manner desired.

It will be understood that when the sleeve 17 is shifted into the ring 6 so as to come against the hub 1 the links 16 will act as toggles and will slide the several segments 12 radially along the disk 3. Thus the segments will thrust against the blocks 9 and cause the teeth 10 to be projected beyond the periphery of the ring 6 and its flange 7. Consequently the teeth can be used as ordinary gear teeth or, if desired, they can be caused to engage within sockets 19 provided within a friction gear 20. Thus the two gears can engage at their peripheries and the teeth 10, by projecting in the sockets 19, will prevent slipping. When it is desired to retract the teeth 10 so as to enable the gears to be shifted relative to each other, it is merely necessary to move the sleeve 17 away from the hub 1 whereupon it will pull through the links 16 upon the several segments 12 and cause said segments to pull upon the blocks 9 and thus draw the teeth 10 into the openings 8. During this retraction of the teeth the inner ends of the blocks will be free to approach each other by reason of their slidable connections with the flanges 13.

What is claimed is:—

1. A disk having openings in the periphery thereof, blocks slidably mounted within the openings and having teeth at their outer ends, said blocks being arranged in groups, members slidable within the disk and engaging the blocks of the respective groups, and means for simultaneously moving said members toward or from each other to retract or project the teeth.

2. A disk having openings in the periphery thereof, blocks slidably mounted within the openings and having teeth at their outer ends, said blocks being arranged in groups, segments slidably mounted within the disk and interlocked with the blocks of the respective groups, the inner ends of the blocks being shiftable toward or from each other during their movement with the segments, and means for simultaneously moving the segments inwardly or outwardly to retract or project the teeth.

3. A gear including a disk, a ring secured to one face thereof and having a spacing flange formed with guide openings, there being guide grooves within the inner face of the disk and radially disposed, blocks slidably mounted within the openings and having teeth at their outer ends, segments slidably mounted between the ring and disk and having guide ribs mounted in the grooves, interfitting portions upon the segments and blocks, said blocks being arranged in groups and one segment being provided for each group of blocks, the inner ends of the blocks being shiftable toward or from each other during the sliding movement of the segments, a shifting sleeve, and link connections between said sleeve and the respective segments.

In testimony that I claim the foregoing as my own, I have hereto affixed my signature in the presence of two witnesses.

HUBERT A. LONG.

Witnesses:
 JOHN L. MEDLIN,
 JOHN H. TRAVER.

Copies of this patent may be obtained for five cents each, by addressing the "Commissioner of Patents, Washington, D. C."